United States Patent [19]

Fey et al.

[11] Patent Number: 4,530,101

[45] Date of Patent: Jul. 16, 1985

[54] ELECTRIC ARC FIRED CUPOLA FOR REMELTING OF METAL CHIPS

[75] Inventors: Maurice G. Fey, Pittsburgh; Thomas N. Meyer, Murrysville, both of Pa.

[73] Assignee: Westinghouse Electric Corp., Pittsburgh, Pa.

[21] Appl. No.: 485,567

[22] Filed: Apr. 15, 1983

[51] Int. Cl.³ ............................................. F27B 15/00
[52] U.S. Cl. ........................................ 373/19; 373/24
[58] Field of Search ..................... 373/18, 19, 21, 22, 373/24; 75/11

[56] References Cited

U.S. PATENT DOCUMENTS

| | | |
|---|---|---|
| 3,663,792 | 5/1972 | Fey . |
| 4,019,895 | 4/1977 | Santen ................. 373/18 X |
| 4,160,118 | 7/1979 | Fey et al. ................. 373/22 |
| 4,160,867 | 7/1979 | Fey et al. . |
| 4,214,736 | 7/1980 | Wolf et al. . |
| 4,247,732 | 1/1981 | Fey . |
| 4,310,350 | 1/1982 | Santen ................. 373/18 X |
| 4,311,519 | 1/1982 | Berry . |
| 4,425,659 | 1/1984 | Stenkvist ................. 373/108 |

OTHER PUBLICATIONS

Metals Handbook, 8th Ed., Metals Park, Ohio, American Society for Metals, 1970, vol. 5, Forging and Casting, pp. 335-348.

*Primary Examiner*—A. D. Pellinen
*Assistant Examiner*—Susan Steward
*Attorney, Agent, or Firm*—John Victor Pezdek

[57] ABSTRACT

A melting furnace or cupola utilizing electric arc heaters to provide an arc-heated air stream to melt loose metal chips as well as larger pieces of metal scrap. In one embodiment, the arc-heated gas stream and metal chips are directed into a melting segment with the melted chips and gas stream passing therefrom into the furnace through a tuyere. In another embodiment an electric arc heater serves as a tuyere for the furnace with the metal chips being fed into the arc-heated stream at the outlet of the arc heater. The chips and arc-heated air stream immediately enter the furnace wherein melting of the metal chips occurs. With either embodiment, recycling of the gases in the furnace and metal chip preheat can be provided.

20 Claims, 4 Drawing Figures

ELECTRIC ARC FIRED CUPOLA FOR REMELTING OF METAL CHIPS

FIELD OF THE INVENTION

This invention relates to a furnace or cupola for the melting of cast iron and steel machining chips in addition to larger forms of metal scrap by means of an electric arc heated gas stream.

BACKGROUND OF THE INVENTION

Ferrous metal chips, such as cast iron or steel machining chips are an abundant and low cost source for foundary production of cast iron. These chips however are not directly amenable to remelting in either conventional cupolas or furnaces because of their low bulk density. This material if charged into the top of a conventional melting cupola would be carried off by the high velocity top gases exiting the cupola before being heated to a temperature sufficient for melting. If charged into an induction type melter the loose chips would float on the bath surface and oxidize before melting. The resultant iron oxide represents both a loss of iron unit yield and an undesirable constituent (wustite) which is detrimental to optimum furnace refractory performance. As a result the chips must be compressed into briquettes prior to use in either the cupola or the induction melter.

A conventional cupola is essentially a cylindrical vertical shaft furnace filled with alternate layers of coke, limestone and scrap iron or steel which are charged through ports proximate the top of the furnace. Preheated air, having a temperature of about 1000° F. is injected through tuyeres at the bottom of the furnace. The hot air or wind burns the charged coke and provides heat required for the melting of the charged metal. A small amount of the carbon contained in the coke dissolves into the molten iron to provide the required carbon content for cast iron, approximately 3 to 3.5%. As the combustion gases move vertically upward through the furnace heat is transferred in a countercurrent manner to the downward descending layers of charged material. Thus it can be seen that if a low density charge material such as machining chips were charged into the top of the cupola they would be caught in the gas stream exiting the top of the furnace.

The primary function of the furnace or cupola is to melt iron or steel scrap. The basic design of a cupola is that of a vertical shaft furnace having an outer steel shell supporting a refractory lining or having a water cooled steel shell. The bottom of the furnace is usually enclosed by two doors which are maintained in the closed position by means of a prop. A sand bed is then layered on top the doors to a depth of about 6 to 10 inches with the upper surface of the sand bed being downwardly sloped toward an iron tap hole. A row of tuyeres for the entry of combustion or blast air is provided about the periphery of the shaft. The tuyeres are connected to a common duct known as a wind box from which they receive the blast air. Charging doors are provided at the upper end of the furnace shaft for the entry of scrap charge and coke.

In operation coke is charged into the furnace to a level of approximately 60 inches above the tuyeres. The shaft is then filled through the charging doors with alternate layers of metallic charge and coke. The coke is ignited and blast air is introduced into the coke bed through the tuyeres thereby developing intense heat. The metal at the upper surface of the coke bed melts and trickles down through the hot coke to collect on the sand bottom. The column of charged material descends to replace the metal melted and a fresh layer of coke replenishes coke which was burned in the bed to melt the charge. This process continues as long as the air supply is continued and coke and metallic charge are added. Molten slag is also formed and floats on the surface of the molten iron collected at the bottom of the furnace. Flux, usually limestone, is added to fluidize the slag which is formed. The hot combustion gases which include carbon monoxide, a reducing gas, move upwardly and countercurrently through the layers of coke and metal scrap and the exit the top of the furnace stack. The passage of these combustion gases preheats and prereduces the materials which have not undergone melting. The gases exiting the top of the furnace are directed into conventional air pollution control devices for cleaning and ultimate release into the atmosphere.

The blast air which is used in the furnace may be either at ambient temperature or at an elevated temperature. This is referred to as cold blast and hot blast, respectively. While the furnace will perform it basic function of melting iron when a cold blast is used, numerous benefits are derived when hot blast is implemented during furnace operation. Hot blast increases the iron temperature, decreases coke comsumption per ton of iron melted, increases the melting rate, and provides secondary benefits in the form of lower melting losses, less sulfur pick up, and increased ability to use low carbon raw materials. Heating of the blast air is accomplished by use of either a separately fired blast air heater or a recuperative blast air heater, the latter combusting the carbon monoxide in the top gases to heat the blast air. The use of hot blast also allows better control over the chemistry of the melted produst. The temperature of the blast air has a direct rapid and quantitative effect the iron tapping temperature and in turn on the carbon content. Thus variation in the temperature of the combustion air will vary the temperature of the melted metal which in turn will vary the percentage of carbon in the melted product.

A more detailed look at the construction and operation of melting furnaces or cupolas may be found in *Metals Handbook*, 8th Ed., Metals Park, Ohio, American Society for Metals, 1970, Vol. 5, *Forging and Casting*, pp. 335-348.

Because the scrap metal in the furnace must move countercurrently to the flow of combustion gases it must be of a size sufficient to ensure its downward progress in the furnace. Because of this the scrap metal typically has a weight in the range of 50 to 150 pounds. Thus, where metal chips or fines are used, they are compressed into briquettes so that they have sufficient weight to travel downwardly through the furnace without being entrained in the countercurrent gas flow. In U.S. Pat. No. 4,160,867 issued July 10, 1979 entitled "Method and Apparatus for Melting Machining Chips", U.S. Pat. No. 4,214,736 issued July 29, 1980 entitled "Acr Heater Melting System" and U.S. Pat. No. 4,311,519 issued Jan. 19, 1982 entitled "Melting Furnace for Granulated Metal" examples of furnaces for the melting of metal chip feed are presented. The first two patents utilize electric arc heaters to directly heat the molten metal bath in the furnace and to heat a stock feed gas used for pre-reduction of the metal chips. However, each of these designs suffer from carryover of fine and small metal chips due to the countercurrent gas flows in the furnace; thus requiring briquetting of the feed materials.

Because metal fines and chips are abundant and low cost it would be advantageous to have a melting furnace which could utilize this material without briquetting.

SUMMARY OF THE INVENTION

This invention relates to a melting furnace or cupola for the melting of metallic chips or fines utilizing an electric arc heated gas stream. In general terms, loose metal chips of scrap iron or steel are introduced into an electric arc heated gas stream flowing into the tuyere of the furnace. Because of high temperature of the electric arc heated gas stream, the metal chips are melted before they can be carried over from the furnace. The heated gas stream then passes countercurrently to the larger pieces of metal scrap which have been charged into the furnace. Thus, the sensible heat in the heated gas is recovered by heat transfer to the charge, optimizing the energy efficiency of the furnace. Further, the furnace is capable of melting both metal chips or fines and more conventionally sized pieces of scrap material.

The electric arc heated gas stream may be air, oxygen or top gas which is recirculated within the system. The choice would be made on the basis of chip surface oxidation, the amount of surface oil (a potential source of reduction in fuel) and the economic trade off between the cost of electricity and coke, e.g. more coke would be consumed if air were used instead of top gas.

In one embodiment of the invention, a melting segment, preferably ceramic lined in order to withstand the high temperatures, is provided intermediate the electric arc heater and the furnace tuyere. Metal chips or fines are injected into the arc heated gas stream and enter the melting segment which is sized to allow sufficient residence time for either partial or complete melting of the chips prior to their introduction into the furnace. Here the molten metal drains from the melting segment into the furnace for collection. Preferably this segment is positioned such that any molten metal produced will flow by gravity into the furnace. In an alternate embodiment of the invention an electric arc heater serves as the tuyere for the furnace. In this configuration chips are introduced into the electric arc heated gas stream immediately upon its introduction into the furnace. In this way, heat is transferred by a convection from the gas stream to the chips and additional heat is transferred to the chips by radiation from the convectively heated and burning coke surfaces in the furnace. This configuration is preferred for metal chips having a size less than minus ¼ inch mesh. It should be noted that with both embodiments the furnaces contain larger pieces of scrap metal which are charged into the furnace by conventional methods. With the use of furnaces embodying the present invention metal chip feed can account for in excess of 70% of the total melted metal produced by the furnace.

Preferably, the metal chips fed into the furnace are dry. This is desirous because any moisture which may be on the metal chips acts to reduce the amount of heat availabale for chip melting. However, because the metal chips are stored in areas where they may become moist either by exposure to the elements or from machine oils, a metal chip dryer can be provided with either of the above embodiments. This chip dryer utilizes the hot top gases exiting from the melting furnace to preheat and prereduce the wet metal chips. The dried chips are then fed into the electric arc heated gas stream for melting. The top gas which is supplied to the chip heater is heated by the combustion of the carbon monoxide reducing gas contained therein. This is accomplished by means of a burner provided on the furnace ahead of the top gas take off to the chip preheater. The burner initiates the combustion of the top gas to raise its temperature in the range of approximately 1600° F. In the chip preheater the temperature of the chips is raised to approximately 1000° F. In addition to the chip preheater, a top gas recycle system can also be incorporated with either embodiment. There the top gas is drawn off the furnace prior to combustion and is recirculated back into the heated gas stream of the electric arc heater for combustion therein. Thus acting to recoup some of the heat value contained in the top gas, mainly in the carbon monoxide reducing gas.

BRIEF DESCRIPTION OF THE DRAWINGS

For a better understanding of the invention reference may be made to the preferred embodiments exemplary of the invention shown in the accompanying drawings.

DESCRIPTION OF THE PREFERRED EMBODIMENTS

Figure 1:
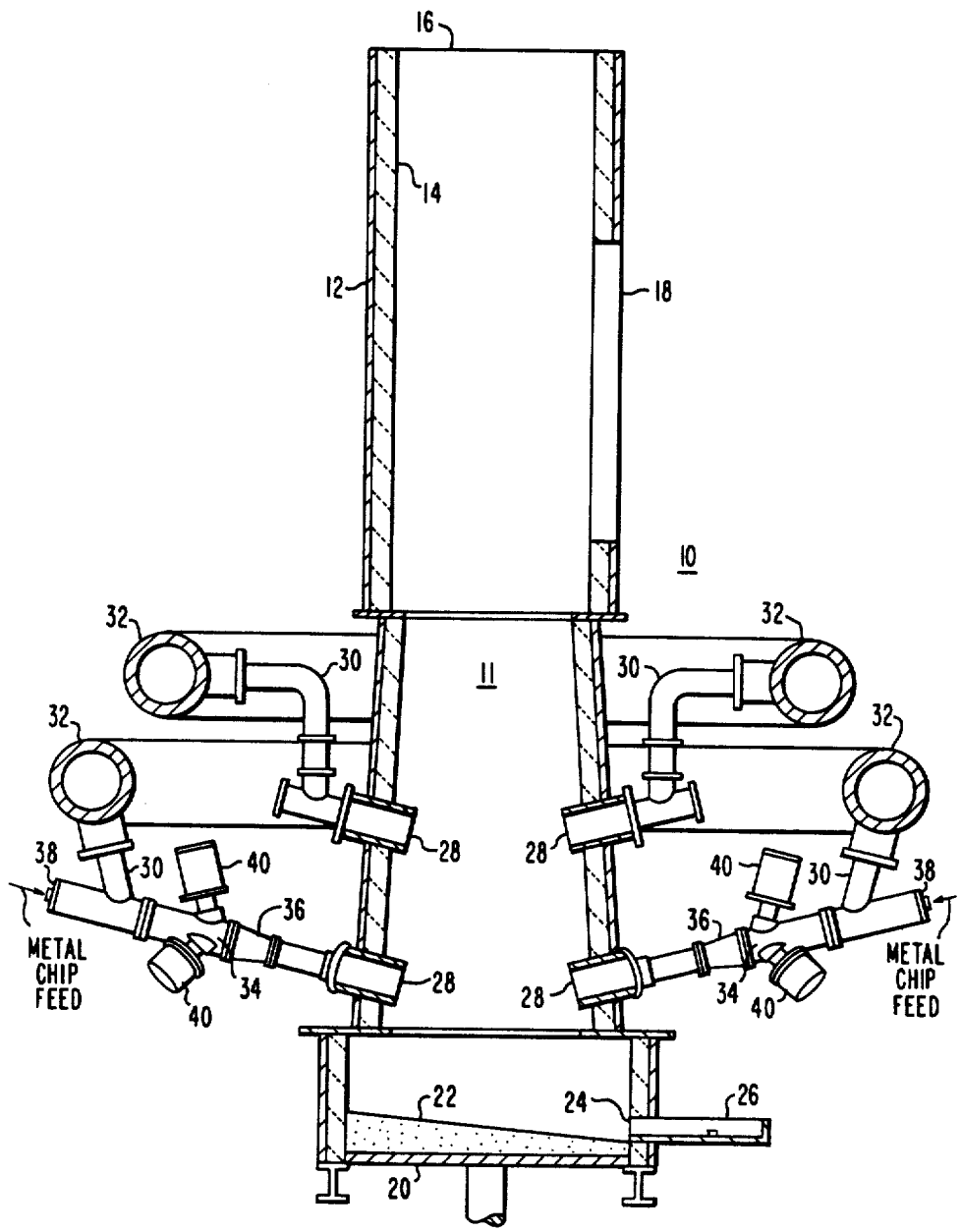
FIG. 1 is a partial sectional and elevational view of a melting furnace utilizing a melting segment intermediate the electric arc heaters and the furnace tuyeres.

In FIG. 1 a melting furnace or cupola, generally indicated at 10 embodying the present invention is shown. The furnace 10 includes a vertical shaft 11 having an outer steel shell 12 and an inner refractory lining 14. A top gas exhaust port 16 and a charging port 18 are provided proximate the top of the shaft 11 and are in communication therewith. The bottom of the shaft 11 is enclosed by a bottom door 20 upon which a sloped sand bed 22 is placed. The bottom of the shaft 11 can be lined with graphite in lieu of the sand. A passage 24 is provided through the shell and refractory lining 14 for an iron and slag tap out port 26. This passage 24 is located proximate the lower end of the sloped sand bed 22. A plurality of tuyeres 28 are provided about the periphery of the shaft 11 and are in communication therewith for providing air or other gases into the shaft 11. One or more rows of tuyeres may be provided on the furnace. In FIG. 1 two rows of tuyeres are illustrated. The location of the tuyeres 28 is dependent upon the capacity of the furnace. Typically these tuyeres are located twelve (12) to thirty-six (36) inches above the sand bed. Each tuyere 28, except as noted below, is connected via a conduit 30 to a wind box 32 which acts to distribute the gas stream to the individual tuyeres 28.

Metallic chip feed is accomplished by means of a structure employing a plenum 34 and melting segment 36 which are disposed about and in communication with a tuyere 28. The inlet 38 of the plenum 34 is adapted to receive metallic chip feed. Disposed about the plenum 34 are one or more electric arc heaters 40 which are in communication with the interior of the plenum 34. Each electric arc heater 40 is connected to sources (not shown) of electric power, gas and cooling water. An electric arc is generated in each electric arc heater 40 and heats the gas stream. The heated gas stream exits the electric arc heater 40 and enters the plenum 34 where it contacts the metal chip feed therein. The cooling water is used to remove excess heat from the electric arc heater 40. The heated gas stream and chip feed exit the plenum 34 and enter the melting segment 36 where a portion of the heat of the gas stream is transferred by convection to the metallic chip feed to cause the melting thereof. The molten metal chips and heated gas stream enter the shaft 11 via the tuyere 28 with the molten metal chips being collected at the bottom 22 thereof and the heated gas stream passing upwardly through the shaft 11. In the shaft 11, the heated gas stream transfers heat to the charge material therein optimizing the energy efficiency of the furnace.

The length of the melting segment 36 can be adjusted for the chip feed rate, average particle size and design parameters of the furnace system such that melting and a specified amount of molten metal superheating can be obtained prior to entry of the molten metal and heated gas stream into the shaft 11. A melting segment which is adjustable in length or the use of additional segments can be employed to vary the total length available for melting. However, because production and feed rates are known, the melting segment is usually built to a specific length to achieve the desired production and feed rates. Preferably, the plenum 34 and melting segment 36 are downwardly sloped such that the molten chips may drain therefrom by gravity into the shaft 11. Although the furnace illustrated in FIG. 1 shows a two tuyeres adapted for chip feed, one or more modified tuyeres each having one or more electric arc heaters can be used.

Because of the high enthalpy of the arc heated gas stream entering the shaft 11 the amount of gas entering via the wind box 32 can be greatly reduced and in some cases eliminated. This in turn reduces the size of any air pollution control system which is used to clean the top gases exiting the exhaust port 16 of the shaft 11.

In addition to metallic chip feed, alternate layers of a mixture of coke and a flux and larger pieces of metallic scrap are charged into the furnace through the charging port 18. The combustion of the coke and arc heated gas stream produces a reducing gas, typically carbon monoxide, which passes upwardly through the furnace to preheat the alternate layers of scrap and coke contained therein. As the heated gas stream passes through the charge, melting thereof takes place forming molten metal and slag which drain to the bottom of the shaft. The slag floats on top of the molten metal and is fluidized by reaction with the flux. The slag and molten metal are then drawn out through the tap-out port 26 of the furnace. During furnace operation the charging port 18 is closed to prevent the escape of the top gases therethrough. Further, most remelting furnaces or cupolas are under a negative pressure in order to reduce emissions to atmosphere. This causes air infiltration into the furnace to occur, especially about the charging port 18, increasing the burden imposed upon the air pollution control systems which are used with the furnace. Because the volume of gas entering the windbox 32 and furnace 10 can be reduced, the negative pressure required by the air pollution control system to draw this volume of gas from the furnace can be reduced, reducing the volume of air infiltration about the charging port 18.

The electric arc heaters 40 are single phase self stabilizing devices which can be operated on DC or AC and are capable of power levels to about 3000 kilowatts or up to 10,000 kilowatts for three phase AC installation. Because the electric arc heaters 40 are of similar construction and operation to the electric arc heater disclosed in U.S. Pat. No. 3,663,792, entitled "Apparatus and Method of Increasing Arc Voltage and Gas Enthalpy in a Self Stabilizing Arc Heater", issued May 16, 1972 and U.S. Pat. No. 4,247,732, entitled "Method and Apparatus for Electrically Firing an Iron Blast Furnace", issued Jan. 27, 1981, both patents being assigned to the assignee of the present invention, and due to the full disclosure in those patents the description of the arc heaters is limited to the basic structure and operation described hereinabove.

Figure 2:
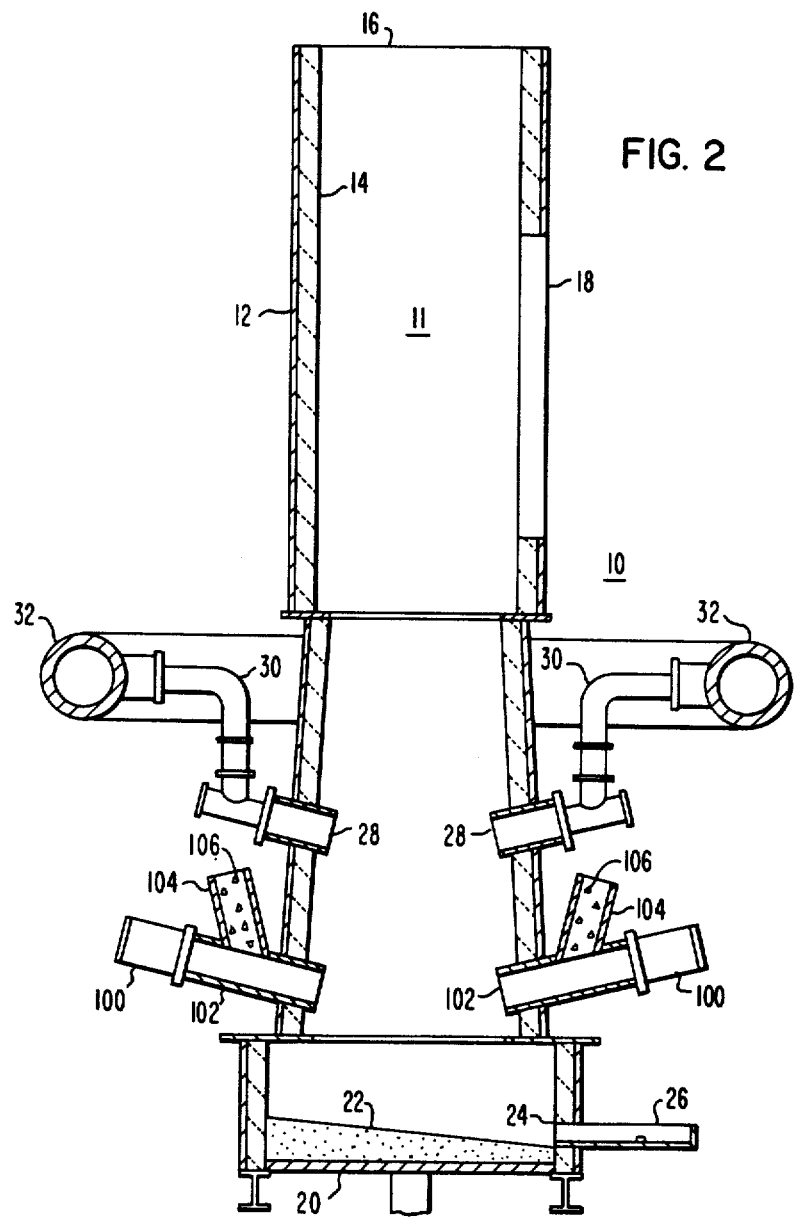
FIG. 2 is a partial sectional and elevational view of a melting furnace illustrating the use of an electric arc heater as a furnace tuyere.

An alternate embodiment of the present invention is illustrated in FIG. 2. Because the structure of the furnace, wind box and tuyeres is substantially similar to that previously described hereinabove their description will not be repeated. In this embodiment a plurality of electric arc heaters 100 are disposed about the periphery of the furnace 10 and are in communication with the shaft 11. Again electric power, cooling water and gas connections are provided for each electric arc heater 100. The gas is heated by an electric arc in the arc heater 100 and is exhausted therefrom into the shaft 11. Disposed about the outlet 102 of each arc heater 100 is a chip feed conduit 104 which is in communication with the outlet 102 of the arc heater 100. The metallic chip feed 106 is conveyed through the chip feed conduit 104 into the arc heated gas stream and immediately introduced into the stack 11 wherein the metal chips are melted. Here heat is transferred by convection from the arc heated gas stream to the metal chips 106 with additional heat being transferred to the metal chips 106 by radiation from the convectively heated and burning coke surfaces in the shaft 11. Again, the heated gases rise upwardly through the other charged material in the furnace and exit at the top thereof. With this arrangement the electric arc heater 100 functions as a tuyere as well as the means to heat the gas stream. This configuration is preferred for metal chips having a size in the range of minus ⅛ inch or less.

Figure 3:
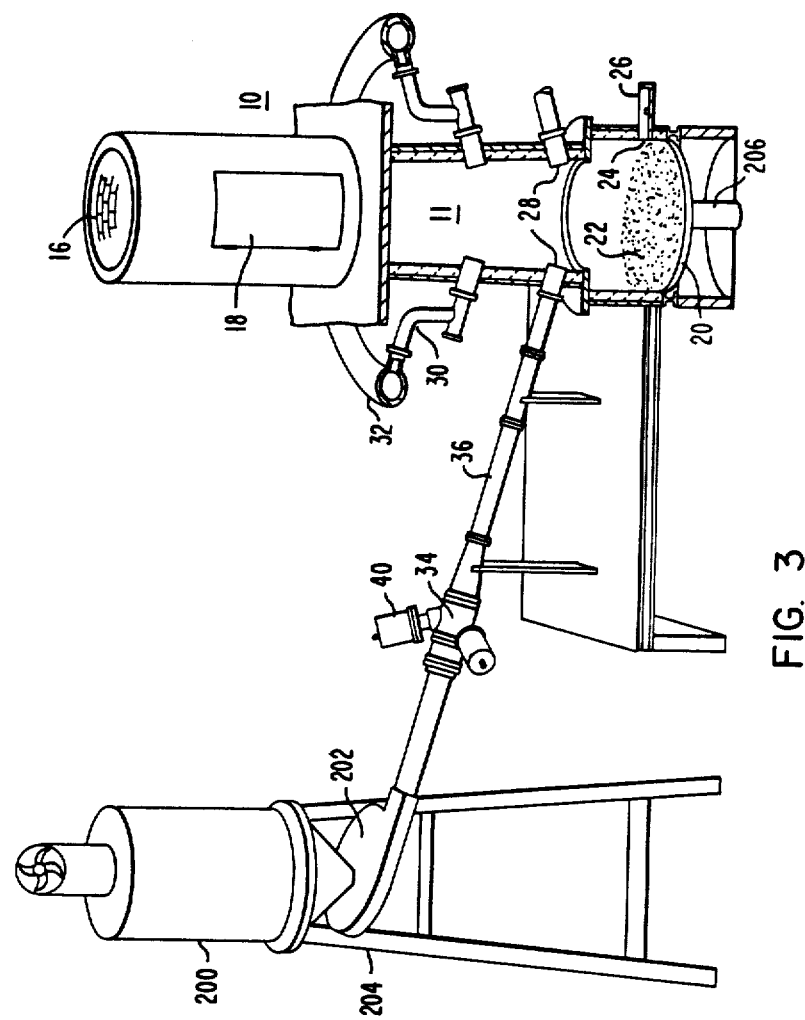
FIG. 3 is an illustration of an electric arc heater fired chip melting system.

An illustration of a chip feed and melting system is shown in FIG. 3. The furnace 10, plenum 34 and arc heaters 40 are substantially the same as those illustrated in FIG. 1 with the exception that additional melting segments 36 are shown intermediate the plenum 34 and furnace tuyere 28. In addition a hopper 200 for storing the metal chips and a mechanical injector 202 are also provided. A discharge chute 204 is provided on the feed hopper 200 for supplying chips to the injector 202 wherein the chips are accelerated to a velocity sufficient to carry them to the melting segments 36. Other material handling means such as a pneumatic conveyor or screw conveyor can be used in lieu of the mechanical injector 202. Also shown in FIG. 3 is a prop 206 for the bottom door 20 of the melting furnace. When the need to repair the interior of the furnace arises this prop 206 is removed allowing the bottom door 20 to fall away from the furnace shaft 11 resulting in a mixture of sand, coke, iron and slap dropping from the shaft 11 thus emptying the shaft 11 of material and allowing the entry thereto for repair.

Figure 4:
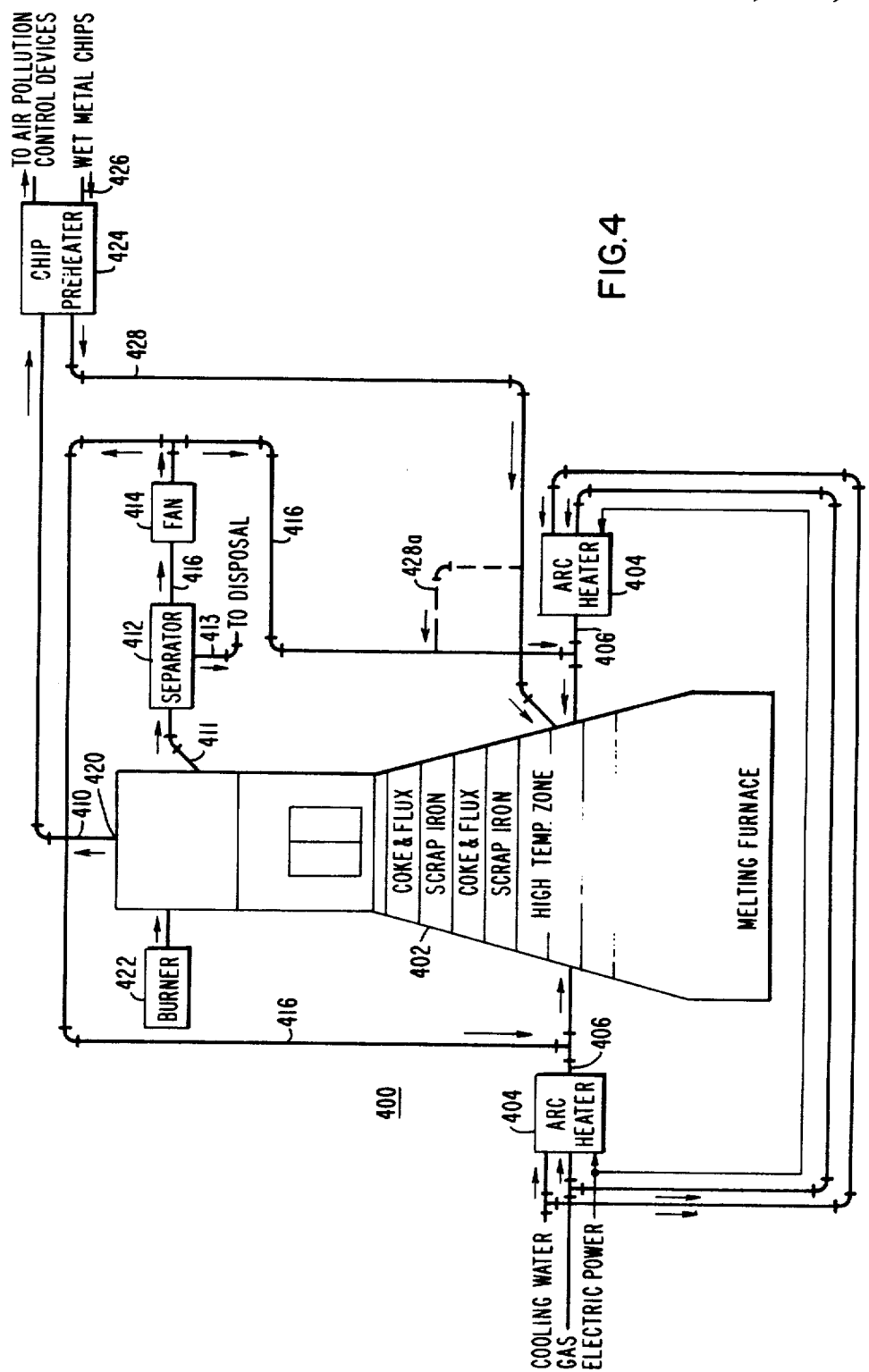
FIG. 4 is a block diagram of a chip melting furnace system utilizing chip preheat and top gas recycle.

A melting furnace system 400 utilizing top gas recycle and metal chip preheat is illustrated in FIG. 4. Here the melting furnace 402 is provided with one or more electric arc heaters 404 disposed about the periphery thereof. The electric arc heaters 404 are substantially similar to those shown in FIG. 2 and are connected to a source of cooling water, gas and electric power. The electrically arc heated gas stream 406 is injected into the furnace 402 melting the metal chips therein. The arc heated gas, preferably air or oxygen, passes upwardly through the coke and larger metal charge contained in the furnace 402 preheating and prereducing the layers of charge; thus optimizing the energy efficiency of the system. The electrically arc heated air and coke combust to provide additional heat and create a high temperature region proximate to but above the electric arc heaters 404. As a result of the combustion process a reducing gas, carbon monoxide, is produced. This reducing gas along with other products of combustion passes upwardly through the material to preheat and prereduce the metal charge forming the top gases 410. The reducing gas, the arc-heated air stream, products of combustion and infiltrated air are collectively termed top gas or gases.

A portion 411 of these top gases 410 are withdrawn from the furnace 400 via a recycle system consisting of a separator 412 and recycle fan 414. This portion 411 of the top gases 410 is directed into the separator 412 by appropriate duct work wherein the gas is separated from entrained particulates 413. The clean gases 416 exit the separator 412 and are drawn through additional duct work into the cycle fan 414 from where they are transferred via duct work into the arc heated air stream 406 for combustion. The reducing gas in the clean gases 416 provides additional heat input to the furnace system 400. The particulates 413 collected in the separator 412 are discharged therefrom for disposal.

The gases not recycled continue to ascend the furnace 402 to exit the exhaust port 420. A combustion device 422 such as a natural gas burner is disposed proximate the exhaust port 412 and is in communication with the furnace 402. This device is used to combust the remaining reducing gas thus raising the temperature of the combusted top gases. The combusted top gases, which include carbon dioxide gas $CO_2$, nitrogen gas $N_2$ and oxygen gas $O_2$, are then directed through ducts into a metal chip preheater 424.

At the preheater 424 wet metal chips 426 are charged into the preheater 424 for predrying and prereducing by the combusted top gases 410. In the preheater 424 the combusted top gases flow in a countercurrent direction to the metal chips. The dried metal chips 428 exit the preheater 424 and are fed into the furnace 402. All or only a portion of the metal chips can be preheated. In addition these preheated chips may be fed directly into the arc heater as shown in FIG. 2 or may be fed into the cleaned recycled top gas 416 as shown by the dashed line 428a in FIG. 4. The combusted top gases 410 which were used to dry the wet chips exit the preheater 424 and are directed to conventional air pollution control devices for cleaning and ultimate emission to the atmosphere. Preferably, the chip preheater 424 is a rotary kiln type as this allows for more thorough drying of the metal chips prior to their introduction into the furnace for melting. Other types of dryers can also be used. These include packed bed dryers, fluidized bed dryers, vacuum dryers, and vibrating dryers, all of which are well known.

Typical operating parameters for the melting furnace illustrated in FIG. 4 for the production of approximately 60 tons per hour of iron are presented in Table 1.

TABLE 1

| | |
|---|---|
| Steel Scrap | 18.1 Ton/Hr |
| Dried Chip Feed | 30.5 Ton/Hr at 1000° F. |
| Wet Chip Feed | 12.1 Ton/Hr |
| Arc-heated Air | 3320 SCFM at 8000° F. |
| Electric Power | 23,175 KW |
| Top Gas Recycle | 2440 SCFM at 750° F. |
| Top Gas Combusted | 4010 SCFM |
| Air Infiltration | 13,780 SCFM |
| Combusted Gases to Preheater | 17,785 SCFM at 1600° F. |

Here approximately 70% of the iron produced in the furnace comes from the use of the metal chip feed.

While the above description of the preferred embodiments utilized refractory lined furnaces, it should be realized that water cooled cupolas may also be employed. In addition, the use of metal chip preheat and top gas recycle can be employed in the first embodiment of the invention wherein melting segments are used.

We claim:

1. A furnace for the melting of metal scrap and metal chips, comprising:
    shaft means for the melting of a metal containing charge therein, the shaft means having an exhaust port and a charging port;
    metal scrap charging means for feeding metal scrap and coke into the interior of the shaft means via the charging port to form the metal-containing charge;
    gas supply means in communication with the interior of the shaft means for supplying an oxygen-containing gas stream thereto;
    electric arc heater means disposed in communication with the gas supply means for heating the gas stream to melt the metal-containing charge and metal chips; and
    metal chips supply means disposed in communication with the electric arc heater means, the gas stream and the shaft means for introducing the metal chips into the heated gas stream prior to its entry into the shaft means, the heated gas stream melting substantially all the metal chips without causing substantial oxidization thereto prior to their entry into the shaft means, the heated gas stream then passing through the metal containing charge transferring heat thereto for melting the metal scrap and the combustion of the coke contained therein and exiting the shaft means at the exhaust port, the molten metal chips and molten metal scrap being collected in the shaft means, the furnace permitting the use of metal chips while substantially eliminating oxidation and carryover thereof in the gas stream while optimizing the energy efficiency of the furnace by transferring heat from the heated gas stream to the metal containing charge therein.

2. The furnace as described in claim 1 wherein the electric arc heater means further comprises:
    a plenum the inlet thereof being adapted to receive metal chips from the metal chip supply means;
    an electric arc heater disposed about the plenum and in communication with the interior of the plenum, the arc heater being connected to a source of a gas containing oxygen which is heated therein and exhausted therefrom into the plenum, the heated gas stream mixing with and heating the metal chips; and a melter segment intermediate the outlet of the plenum and the shaft means and in communication with the interior of the plenum and the shaft wherein the heated metal chips are melted with the molten metal chips and heated gas stream passing therefrom into the shaft means.

3. The furnace as described in claim 1 wherein the electric arc heater means further comprises:

an electric arc heater disposed about the periphery of the stack means, the outlet thereof being in communication with the shaft and each inlet thereof being connected to a source of gas containing oxygen which is heated therein and exhausted therefrom into the shaft; and a conduit adapted to convey metal chips from the metal chip supply means, the conduit disposed about and in communication with the outlet of the electric arc heater such that metal chips conveyed through the conduit enter the heated gas stream with the metal chips and heated gas stream entering the shaft means.

4. The furnace as described in claim 1 further comprising:

reducing gas withdrawl means disposed in communication with the shaft and the electric arc heating means for withdrawing a portion of the reducing gas and heated gas stream from the stack means, the withdrawn reducing gas and heated gas stream being recirculated to the electric arc heating means for injecting into the heated gas stream.

5. The furnace as described in claim 1 wherein the scrap metal and melt chips are selected from a group consisting of steel, iron, or a mixture of steel and iron.

6. The furnace as described in claim 1 wherein the gas stream is selected from a group consisting of air or oxygen.

7. A furnace for the melting of metal scrap including metal chips, comprising:

vertical shaft means for the melting of a charge therein, the shaft having an exhaust port, a charging port, and a tap-out port, the charge consisting of metal scrap, coke and flux and entering the shaft through the charging port and passing downwardly through the shaft;

metal scrap charging means for feeding metal scrap and coke into the interior of the shaft means via the charging port to form the metal-containing charge;

gas supply means in communication with the interior of the shaft means for supplying an oxygen-containing gas stream thereto;

electric arc heater means disposed in communication with the gas supply means for heating the gas stream to melt the metal-containing charge, metal chips, fluid and combusting the coke, the coke combustion providing additional heat for melting carbon for the molten metal and a reducing gas;

metal chips supply means disposed in communication with the electric arc heater means, the gas stream and the shaft means for introducing the metal chips into the heated gas stream prior to its entry into the shaft means, the heated gas stream melting substantially all the metal chips without causing substantial oxidation thereto prior to their entry into the shaft means, the heated gas stream then passing through the metal-containing charge transferring heat thereto forming molten metal and slag, combusting the coke contained therein and exiting the shaft means with the reducing gas at the exhaust port, the slag forming on top of the molten metal and being fluidized by reaction with the flux, the molten metal and slag collecting proximate the bottom of the shaft and the tap-out port through which the molten metal and slag can be withdrawn;

reducing gas combustion means disposed in communication with the shaft proximate the exhaust port for the combustion of the reducing gas, the combusted reducing gas and heated gas stream forming a top gas exiting the stack means at the exhaust port; and metal chips drying means disposed in communication with the exhaust port and the metal chip supply means for the predrying and prereduction of a portion of the metal chips prior to their introduction into the heated gas stream, the top gas entering the metal chips drying means and contacting the metal chips therein for the drying and prereduction thereof.

8. The furnace as described in claim 7 wherein the electric arc heater means further comprises:

a plenum the inlet thereof being adapted to receive metal chips from the metal chip supply means;

an arc heater disposed about the plenum and in communication with the interior of the plenum, the arc heater being connected to a source of a gas containing oxygen which is heated therein nd exhausted therefrom into the plenum, the heated gas stream mixing with and heating the metal chips; and a melter segment intermediate the outlet of the plenum and the shaft means and in communication with the interior of the plenum and the shaft wherein the heated metal chips are melted with the molten metal chips and heated gas stream passing therefrom into the stack means.

9. The furnace as described in claim 7 wherein the electric arc heater means further comprises:

an electric arc heater disposed about the periphery of the shaft means, the outlet thereof being in communication with the shaft and each inlet thereof being connected to a source of gas containing oxygen which is heated therein and exhausted therefrom into the shaft; and a conduit adapted to convey metal chips from the metal chip supply means, a conduit disposed about and in communication with the outlet of the electric arc heater such that metal chips conveyed through the conduit enter the heated gas stream with the metal chips and heated gas stream entering the shaft means.

10. The furnace as described in claim 7 further comprising:

reducing gas withdrawal means disposed in communication with the shaft means and the electric arc heating means for withdrawing a portion of the reducing gss and heated gas stream from the shaft means, the withdrawn reducing gas and heated gas stream being recirculated to the electric arc heating means for injection into the heated gas stream.

11. The furnace as described in claim 7 wherein the metal chip drying means further comprises a chip inlet and outlet and a top gas inlet and outlet, the metal chips to be preheated and dried entering the metal chip drying means at the chip inlet;

a top gas duct disposed in communication with the exhaust port of the furnace and the top gas inlet of the metal chip drying means, the top gas passing therethrough into the metal chip drying means wherein the top gas contacts the metal chips to dry and preheat them as it passes countercurrently thereto and exits the metal chip drying means at the top gas outlet; and a metal chip feed duct disposed in communication with the chip outlet of the metal chip drying means and the electric arc heater means, the preheated and dried metal chips passing therethrough from the chip outlet into the heated gas stream of the electric arc heater means.

12. The furnace as described in claim 11 wherein the metal chip drying means is selected from the group consisting of rotary kilns, vacuum type dryings, packed bed dryers, fluidized bed dryers or vibrating type dryers.

13. The furnace as described in claim 7 wherein the scrap metal and melt chips are selected from a group consisting of steel, iron, or a mixture of steel and iron.

14. The furnace as described in claim 7 wherein the gas stream is selected from a group consisting of air or oxygen.

15. The furnace as described in claim 7 wherein the metal chip drying means further comprises:

a rotary kiln having a chip inlet and outlet and a top gas inlet and outlet, the metal chips to be preheated and dried entering the rotary kiln at the chip inlet;

a top gas duct disposed in communication with the exhaust port of the furnace and the gas inlet of the rotary kiln, the top gas passing therethrough into the rotary kiln wherein the top gas contacts the metal chips to dry and preheat them as it passes countercurrently thereto and exits the rotary kiln at the top gas outlet; and a chip feed duct disposed in communication with the chip outlet of the rotary kiln and the electric arc heater means, the preheated and dried metal chips passing therethrough from the chip outlet into the heated gas stream of the electric arc heater means.

16. A process for the melting of metal chips and metal scrap in a shaft furnace, comprising:

charging the shaft furnace with material including a mixture of scrap metal and coke to form a metal containing charge therein;

heating an oxygen-containing gas in an electric arc heater to form a heated gas stream for melting the metal chips and metal scrap;

introducing the metal chips into the heated gas stream prior to the entry thereof into the shaft furnace;

melting in the heated gas stream substantially all of the metal chips prior to the entry thereof into the furnace without substantial oxidation thereto caused by the heated gas stream thereby substantially eliminating the carryover of the metal chips from the furnace;

introducing the heated gas stream containing the molten metal into the shaft furnace wherein the molten metal separates from the heated gas stream;

drawing the heated gas stream through a portion of the charge for transferring heat thereto thereby cooling the heated gas stream, the transferred heat assisting in the melting of the metal scrap into molten metal and the combustion of the coke thereby optimizing the energy efficiency of the furnace by the transfer of the heat of the heated gas stream to the charge; and collecting in the shaft furnace the molten metal formed by the melting of the metal chips and the scrap metal for recovery; and exhausting the gas stream from the furnace.

17. The process of claim 16 wherein the scrap metal and metal chips are selected from a group consisting of steel, iron, or a mixture of steel and iron.

18. The process of claim 17 wherein the metal chips provide up to about 70 percent of the total molten metal produced.

19. The process of claim 16 wherein the oxygen-containing gas is selected from the group consisting of air or oxygen.

20. The process of claim 16 further comprising:

recirculating a first portion of the exhausted gas into the heated gas stream;

recirculating a second portion of the exhausted gas stream into a metal chip drying means; and drying and preheating the metal chips prior to their entry into the heated gas stream.

* * * * *